(12) United States Patent
Li et al.

(10) Patent No.: US 12,024,608 B2
(45) Date of Patent: Jul. 2, 2024

(54) POLYOLEFIN-BASED COMPOSITION FOR A LID AND METHODS OF MAKING AND USING

(71) Applicant: DART CONTAINER CORPORATION, Mason, MI (US)

(72) Inventors: Chengtao Li, Novi, MI (US); Robert Allan Brubaker, Mason, MI (US); Jacob Christopher Purcell, Howell, MI (US)

(73) Assignee: Dart Container Corporation, Mason, MI (US)

( * ) Notice: Subject to any disclaimer, the term of this patent is extended or adjusted under 35 U.S.C. 154(b) by 0 days.

(21) Appl. No.: 18/094,051

(22) Filed: Jan. 6, 2023

(65) Prior Publication Data

US 2023/0143697 A1 May 11, 2023

Related U.S. Application Data

(62) Division of application No. 16/150,036, filed on Oct. 2, 2018, now Pat. No. 11,584,838.

(Continued)

(51) Int. Cl.
*B65D 65/38* (2006.01)
*B65D 43/02* (2006.01)
(Continued)

(52) U.S. Cl.
CPC ........ *C08J 9/0066* (2013.01); *B65D 43/0202* (2013.01); *B65D 65/38* (2013.01);
(Continued)

(58) Field of Classification Search
CPC ..... C08J 9/0066; C08J 9/08; C08J 9/10; C08J 9/36; C08J 2201/03; C08J 2203/02; C08J 2203/04; C08J 2205/044; C08J 2205/10; C08J 2323/12; B65D 43/0202; B65D 65/38; B65D 2543/00092; B65D 2543/00296;
(Continued)

(56) References Cited

U.S. PATENT DOCUMENTS

| 4,407,768 A | 10/1983 | Garcia et al. |
| 4,447,479 A † | 5/1984 | Harrison |

(Continued)

FOREIGN PATENT DOCUMENTS

| CA | 2947689 A1 | 8/2016 |
| EP | 3177540 B1 | 10/2019 |

(Continued)

OTHER PUBLICATIONS

Canadian Office Action for Counterpart CA3020302, Dated Jun. 21, 2023, 5 Pages.

(Continued)

*Primary Examiner* — Monica A Huson
*Assistant Examiner* — Kelsey C Grace
(74) *Attorney, Agent, or Firm* — McGarry Bair PC

(57) ABSTRACT

Aspects of the present disclosure relate to a polyolefin composition and processes suitable for use in forming a lid for a hot food or beverage container that has a stiffness comparable to a similar lid made using high impact polystyrene and a density less than water at 23° C.

25 Claims, 6 Drawing Sheets

Related U.S. Application Data

(60) Provisional application No. 62/570,222, filed on Oct. 10, 2017.

(51) Int. Cl.
| | | |
|---|---|---|
| *C08J 9/00* | (2006.01) | |
| *C08J 9/08* | (2006.01) | |
| *C08J 9/10* | (2006.01) | |
| *C08J 9/36* | (2006.01) | |
| *B32B 27/20* | (2006.01) | |
| *B32B 27/32* | (2006.01) | |

(52) U.S. Cl.
CPC . *C08J 9/08* (2013.01); *C08J 9/10* (2013.01); *C08J 9/36* (2013.01); *B32B 27/20* (2013.01); *B32B 27/32* (2013.01); *B65D 2543/00092* (2013.01); *B65D 2543/00296* (2013.01); *B65D 2543/00351* (2013.01); *C08J 2201/03* (2013.01); *C08J 2203/02* (2013.01); *C08J 2203/04* (2013.01); *C08J 2205/044* (2013.01); *C08J 2205/10* (2013.01); *C08J 2323/12* (2013.01)

(58) Field of Classification Search
CPC .......... B65D 2543/00351; B32B 27/20; B32B 27/32

See application file for complete search history.

(56) References Cited

U.S. PATENT DOCUMENTS

| | | |
|---|---|---|
| 6,100,512 A | 8/2000 | Neculescu |
| 6,211,500 B1 | 4/2001 | Cochran, II |
| 6,274,248 B1 | 8/2001 | Goto |
| 6,420,689 B1 | 7/2002 | Cochran, II |
| 6,846,533 B2 | 1/2005 | Wu |
| 6,877,601 B1 | 4/2005 | Colombo |
| 6,893,694 B2 | 5/2005 | Wu |
| 6,923,338 B2 | 8/2005 | Dees |
| 7,741,398 B2 | 6/2010 | Heck |
| 7,754,299 B2 | 7/2010 | Wu |
| 7,767,283 B2 | 8/2010 | Forsberg |
| 8,038,841 B2 | 10/2011 | Matsushita |
| 8,361,612 B2 | 1/2013 | Komatsu |
| 9,174,370 B2 | 11/2015 | Komatsu |
| 2006/0270762 A1 | 11/2006 | Noel |
| 2008/0287576 A1* | 11/2008 | Nichols ............ C08K 3/26 524/427 |
| 2012/0267368 A1 | 10/2012 | Wu |
| 2013/0133295 A1 | 5/2013 | Shah |
| 2015/0143782 A1 | 5/2015 | Shah |
| 2015/0353240 A1 | 12/2015 | Nelms |
| 2016/0000243 A1* | 1/2016 | Tedford, Jr. ....... A47G 19/2205 220/254.1 |
| 2016/0090218 A1 | 3/2016 | Sun et al. |
| 2016/0168352 A1† | 6/2016 | Meadows et al. |
| 2017/0182498 A1 | 6/2017 | Matsushita |

FOREIGN PATENT DOCUMENTS

| | | |
|---|---|---|
| JP | H04159345 A | 6/1992 |
| JP | 5297702 B2 | 9/2013 |

OTHER PUBLICATIONS

Mapka®, ERI Eco Research Institute Ltd., http://ecobioplastics.jp/en/products/mapka, accessed Oct. 2, 2018.

\* cited by examiner
† cited by third party

POLYOLEFIN-BASED COMPOSITION FOR A LID AND METHODS OF MAKING AND USING

CROSS-REFERENCE TO RELATED APPLICATIONS

This application is a divisional application of U.S. patent application Ser. No. 16/150,036, filed Oct. 2, 2018, now allowed, which application claims the benefit of U.S. Provisional Patent Application No. 62/570,222, filed Oct. 10, 2017, both of which are incorporated herein by reference in their entirety.

BACKGROUND

Polystyrene is commonly used for forming disposable containers, cups, lids, and other food service articles. Polystyrene has a stiffness and heat resistance suitable for use in making food service articles for use in hot food service, such as coffee cup and soup bowl lids. However, polystyrene can be challenging to recycle, dissuading some consumers from purchasing products made using polystyrene. In the United States, an increasing number of municipalities are banning or placing restrictions on the use of polystyrene in food service articles due to poor public perception.

BRIEF SUMMARY

According to one aspect, a lid for a food or beverage container is made from a sheet comprising at least one polyolefin with at least one filler. The sheet includes a plurality of expanded cells providing the lid with a density of less than 1 g/cm$^3$ at 23° C.

In another aspect, a process for forming a lid for a food or beverage container is provided. The process includes providing a polyolefin blend including at least one polyolefin and at least one filler to an extruder. A blowing agent is provided to the polyolefin blend. The polyolefin blend is extruded to form a polyolefin-based sheet and the polyolefin-based sheet is at least partially expanded to form a plurality of expanded cells within the sheet. The expanded polyolefin-based sheet can be formed into the shape of a lid. The lid can have a density less than water at 23° C.

DETAILED DESCRIPTION

Aspects of the present disclosure relate to a polyolefin composition and processes suitable for use in forming a lid for a food service container, such as a hot food or beverage container, having a stiffness comparable to a conventional lid made using high impact polystyrene (HIPS) such that the polyolefin-based lid can be used as a replacement of the polystyrene-based lid. In addition, the polyolefin composition and processes of the present disclosure provide a lid that is also recyclable using conventional practices that rely on capturing recyclable material floating in a recycling stream. According to another aspect of the present disclosure, recyclability of the polyolefin-based lid can be maintained by configuring the polyolefin composition such that the lid has a density less than 1 g/cm$^3$ at 23° C. such that the polyolefin-based lid floats in the recycling stream.

Aspects of the present disclosure relate to a polyolefin composition for forming a polyolefin-based sheet having a stiffness suitable for use in forming a lid for a hot beverage or food container in combination with a density suitable for recycling. The polyolefin composition can be used to form a polyolefin-based sheet that can be thermoformed or molded into the desired lid shape. While aspects of the present disclosure are discussed in the context of a lid for use with a cup intended to hold a hot liquid, aspects of the present disclosure can be used in a similar manner to form a polyolefin-based sheet that can be thermoformed or molded into the shape of other articles, such as soup containers and lids, for example. In addition, aspects of the present disclosure are not limited to use with hot food and beverages, but may be used with room temperature or chilled food and beverages.

Figure 1:
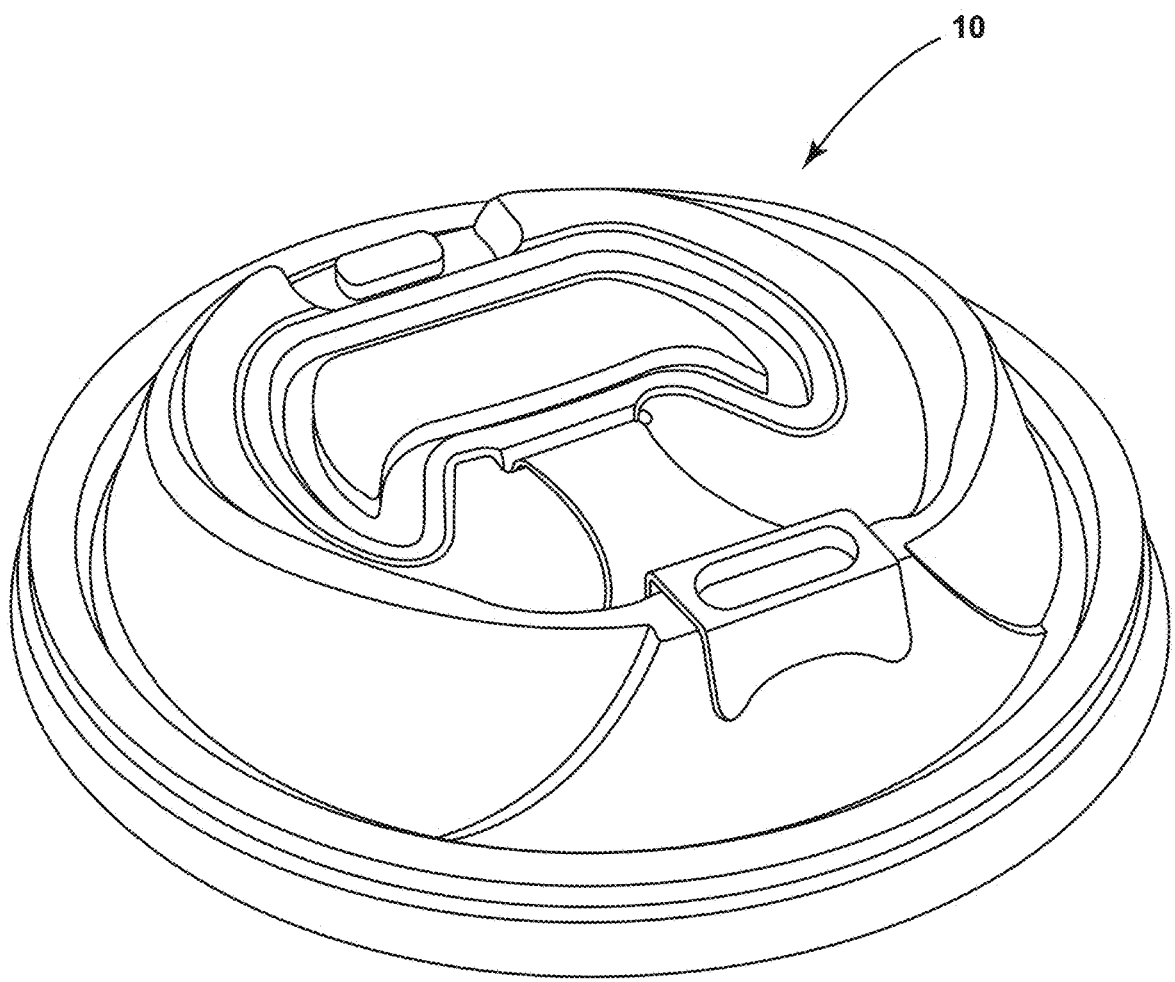
FIG. 1 is a perspective view of an exemplary hot cup lid according to an aspect of the disclosure.

FIG. 1 illustrates an exemplary cup lid 10 that may be formed by thermoforming a polyolefin-based sheet according to an aspect of the present disclosure. The cup lid 10 can have any desired shape and optionally the same shape as a conventional dome-shaped cup lid that is used with a cup intended to hold a hot beverage, such as coffee or tea. The polyolefin-based sheet can be used to form lids having other shapes, including other dome-shaped, flat, or frusto-conical shaped lids in a manner similar to what is described in the present disclosure.

Conventional coffee cup lids are often made using unexpanded high impact polystyrene (HIPS). Cup lids made by thermoforming HIPS sheets have a high heat deflection temperature (HDT), also referred to as high heat resistance. A material having a high HDT, such as HIPS, increases the resistance of the lid to heat distortion that can occur when the lid is placed on a container holding a hot liquid or when the lid is reheated, such as when the container and lid are placed in a microwave for heating the contents of the container. Polyolefins, such as polypropylene, generally have a flexural modulus less than that of HIPS, particularly at hot food service temperatures, and thus typically present a challenge for use in forming a hot cup lid. A cup lid made using a polypropylene having a low flexural modulus may become soft and/or weaken when the cup lid is placed on a cup holding a hot liquid or when the cup lid is reheated.

According to an aspect of the present disclosure, a polyolefin composition includes at least one polyolefin and at least one filler for use in forming a polyolefin-based sheet that can be shaped into a lid having a stiffness that is at least comparable to a similar lid made from unexpanded HIPS at temperatures typically experienced by lids used in hot food service. Hot food service temperatures are typically considered to be about 90° C. or greater. As used herein, comparable is used to refer to a characteristic that is within +/−15%, optionally within +/−10%, and further optionally within +/−5% of the reference material or article. As used herein, a lid is similar to another lid when the lid dimensions and/or part weight are comparable such that the similar lids can be used interchangeably on a container.

The at least one polyolefin and the at least one filler, and optionally other additives, can be combined to form a blend suitable for extrusion through a die to form the polyolefin-based sheet. Extrusion refers to a process for shaping or forming an article by moving material through a die opening by forcing, pressing, and/or pushing the material through the die opening. The die opening can be an orifice having any desired shape, such as a slit. The polyolefin-based blend can be extruded through the die into a sheet or a cylinder that is subsequently cut to form a sheet for shaping into a lid. Extrusion can be performed continuously to form a long sheet or cylinder or can be semi-continuous such that multiple shorter segments are produced for later shaping into a lid. The lid production process may include in-line extrusion thermoforming or off-line extrusion thermoforming. Extrusion can be performed using a single screw extruder or a twin screw extruder, although the present disclosure is not limited to any particular extrusion device or die.

In one aspect of the present disclosure, thermoforming is performed on the materials exiting the extruder while they are still in molten/heated form from the extrusion process. The molten sheets from the extruder can be thermoformed. In another aspect, the extruded sheets can be allowed to cool to room temperature and solidify following extrusion. The solidified sheets can then be reheated for forming using a reciprocating former.

The amount and type of filler combined with the polyolefin to form the extrusion blend is selected to provide a polyolefin-based sheet that can be used to form a lid having a stiffness that is at least comparable to and optionally greater than that of a similar lid made from unexpanded HIPS. Optionally, the amount and type of filler are selected to provide the polyolefin-based sheet with a shrinkage rate less than a polypropylene sheet without filler. In one example, the amount and type of filler are selected to provide the polyolefin-based sheet with a shrinkage rate of about 0.013 inches (0.33 mm) to 0.015 inches (0.38 mm) per inch (25.4 mm), or about 1.3 to 1.5%, during storage after forming the lid. The shrinkage rate during sheet formation and trimming can be about 1.4% or 0.014 inches (0.36 mm) per inch (25.4 mm).

Non-limiting examples of suitable polyolefins include polypropylene homopolymers, polypropylene impact copolymers, ethylene-propylene copolymers, high density polyethylene, and combinations thereof. Copolymers of polypropylene can include copolymers in which the polymer is derived from polypropylene monomers and at least one other species of monomer or a block copolymer derived from blocks of polypropylene monomers and blocks derived from at least one other species of monomer, non-limiting examples of which include ethylene, propylene, or a combination of ethylene and propylene.

According to one aspect of the present disclosure, the polyolefin includes a polypropylene that is a high modulus polypropylene homopolymer having a flexural modulus of at least about 290,000 psi, optionally at least about 300,000 psi, as measured according to ASTM D-790A. Optionally, the polyolefin is a high crystalline polypropylene characterized by low xylene solubles (XS), which is generally considered to be related to isotacticity and crystallinity. When compared to standard homopolymer resins, high crystalline polypropylene exhibits a higher stiffness and increased chemical and heat resistance. In one aspect, the polyolefin is a high crystalline polypropylene having a flexural modulus of at least about 290,000 psi, optionally at least about 300,000 psi, and further optionally about 290,000 to 300,000 psi, as measured according to ASTM D-790A. In another aspect, polypropylenes having an HDT of at least about 95° C., optionally at least about 105° C., further optionally at least about 115° C. at 66 psi, as measured according to ASTM D648, may be used.

According to another aspect, preferred polypropylenes have a modulus of elasticity, as measured by Dynamic Mechanical Analysis (DMA), of at least about 160,000 psi, optionally at least about 210,000 psi, further optionally at least about 230,000 psi at temperatures corresponding to hot drink temperatures according to ASTM D4065 and ASTM E2254-03. An example of a hot drink temperature includes 90° C.

In one aspect of the present disclosure, the polyolefin includes at least one polypropylene having a flexural modulus of at least about 290,000 psi, optionally at least about 300,000 psi, an HDT of at least about 95° C., optionally at least about 105° C., further optionally at least about 115° C., and/or a modulus of elasticity of at least about 160,000 psi, optionally at least about 210,000 psi, further optionally at least about 230,000 psi.

The filler can be a mineral filler, a natural fiber-based filler, or combinations thereof. Non-limiting examples of suitable mineral fillers include talc, calcium carbonate, mica, wollastonite, and combinations thereof. Non-limiting examples of suitable natural fiber-based fillers include wood fiber, paper powder, cellulose fiber, and combinations thereof. Optional additives for use with the polyolefin composition include colorants and processing aids.

The thickness of the extruded sheet, when used for forming lids, can be about 0.035 inches (0.9 mm) or less, optionally about 0.025 inches (0.6 mm) or less. The thickness of the lid formed from the extruded sheet can vary depending on the lid design, but can be less than about 0.01 inches (0.25 mm), optionally less than about 0.015 inches (0.4 mm), further optionally less than about 0.025 inches (0.6 mm), still further optionally less than about 0.035 inches (0.9 mm), and further optionally within the range of about 0.015 to 0.018 inches (0.4 to 0.46 mm).

The polyolefin composition is also treated such that the sheet formed using the polyolefin composition has a plurality of expanded cells formed within the sheet to provide the sheet with an expanded cellular structure to decrease the density of the extruded polyolefin-based sheet compared to a similar polyolefin-based sheet that has not been treated. According to an aspect of the present disclosure, the cellular structure comprises cells distributed throughout the material at a lower density than a conventional polymeric foam. In one aspect of the material, the proportion of the cross-sectional area of the sheet that is solid and unfoamed is greater than the proportion of the cross-sectional area of the sheet that includes expanded cells. In contrast to a conventional foam material in which expanded cells extend one after another throughout a given foamed section of the sheet, the materials and lids according to one aspect of the present disclosure include expanded cells that are randomly distributed within the sheet and do not extend consistently throughout a given section of the sheet. According to one aspect of the present disclosure, treatment of the polyolefin composition to decrease the density of the extruded sheet includes adding a blowing agent to the extrusion blend. According to another aspect, treatment to decrease the density includes a method of extruding the polyolefin composition to induce the formation of a plurality of expanded cells within the extruded sheet.

In accordance with one aspect, a blowing agent is added to the polyolefin blend prior to extrusion to induce the formation of a plurality of expanded cells within the extruded sheet. The amount and type of blowing agent is selected to provide a predetermined decrease in the density of the extruded sheet. In one example, the amount and type of blowing agent is selected to provide a decrease in density of about 5 to 10% compared to a similar polyolefin blend, processed in a similar manner, which does not include a blowing agent.

In another example, the amount and type of blowing agent is selected to decrease the density of the extruded sheet such that a lid formed from the sheet has a density less than 1 g/cm$^3$ at 23° C. Unless otherwise stated, densities are given at 23° C. and atmospheric pressure. Having a density less than 1 g/cm$^3$ allows the lid to float on water, thus facilitating recycling of the lid material using processes that rely on the material to be recycled floating at or near the surface of the recycling stream. Optionally, the material can also be defined in terms of its specific gravity relative to water. The lid can be formed to have a specific gravity less than 1, relative to water at 23° C. and atmospheric pressure, such that the lid floats in water.

The blowing agent can be selected from any suitable chemical or physical blowing agent compatible with the polyolefin(s) present in the polyolefin composition. The blowing agent introduces gas (e.g., carbon dioxide, nitrogen, steam) into the resin mixture to form an expanded cellular structure within the resin and reduce the density of the extrudate. According to one aspect of the present disclosure, the blowing agent can be a chemical blowing agent in the form of organic or inorganic materials that release gas upon thermal decomposition. Expansion of the cells in the resin mixture can occur during and/or after extrusion. Non-limiting examples of suitable chemical blowing agents include sodium bicarbonate, sodium carbonate, ammonium bicarbonate, ammonium carbonate, and ammonium nitrite. According to one aspect, the blowing agent can be present in an amount of about 0.2 to 3 wt. %, about 0.5-3 wt. %, optionally about 0.5-2 wt. %, further optionally about 1-3 wt. %.

The amount and type of filler and the amount and type of blowing agent can be selected in combination to provide an extruded sheet that can be formed into a lid having the desired physical properties suitable for use as a hot food service lid and having a density less than 1 g/cm$^3$, optionally less than 0.999 g/cm$^3$, further optionally in the range of about 0.900 to 0.999 g/cm$^3$ at 23° C. and atmospheric pressure. Optionally, the hot food service lid can be defined as having a specific gravity less than 1, relative to water at 23° C. and atmospheric pressure.

As the amount of filler added to the polyolefin blend increases, there is an increase in the stiffness of the extruded polyolefin-based sheet and a concomitant increase in the density of the sheet and thus the lid formed using the polyolefin blend. If the density of the lid increases to such an extent that the lid no longer floats in a recycling stream (i.e. the specific gravity of the lid relative to the water in the recycling stream is greater than 1), then the lid cannot be recycled using this conventional recycling method. The addition of a blowing agent can offset this increase in density, allowing the filler to be selected from a broader range of amounts and types to provide the desired stiffness for a hot food service lid while maintaining a density suitable for recycling the lid in a recycling stream.

For example, a polyolefin blend used to make the hot cup lid of FIG. 1 that is based on polypropylene is generally limited to a mineral filler loading of less than about 10-12 percent by weight (wt. %) in order to maintain the ability of the lid to float in the recycling stream. However, this loading amount of mineral filler is not sufficient to increase the stiffness of a polypropylene-based lid to an amount comparable with a HIPS lid under hot food service conditions.

According to an aspect of the present disclosure, a polyolefin blend including polypropylene and a mineral filler in the range of about 12 wt. % or greater, optionally about 15 wt. % or greater, optionally about 18 wt. % or greater, further optionally about 20 wt. % or greater, still further optionally about 25 wt. % or greater, and optionally in a range of about 20 wt. % to 25 wt. %, in combination with a blowing agent provides a lid having a stiffness comparable to a HIPS lid in combination with a density less than 1 g/cm$^3$. The blowing agent can be present in an amount of about 0.2-3 wt. %, optionally about 0.5-3 wt. %, optionally about 0.5-2 wt. %, further optionally about 1-3 wt. %, to provide a decrease in lid density of about 5-10% compared to a similar lid formed in the absence of a blowing agent. The stiffness and density characteristics can be maintained even in the presence of additives, such as colorants.

The extruded polyolefin-based sheet can be formed into a lid having the desired shape and dimensions by thermoforming. Non-limiting examples of thermoforming can include vacuum molding, pressure molding, plug-assist molding, and vacuum snapback molding. The thermoforming process can include heating the polyolefin-based sheet (also referred to as a web) to a melting or softening temperature and then stretching or drawing the sheet over a mold. The web can be stretched or drawn over the mold while the web is still in a soft or molten state from the extrusion process without the application of heat from a heating unit. Optionally, the thermoforming process includes a heating unit, such as an oven, to reheat the web to a molten or soft state suitable for thermoforming. The material can be maintained over the mold as the material cools and solidifies to form the article. The formed article can then be trimmed from the thermoformed sheet and removed from the mold to form the lid. Optionally, the trimmed material is reground and processed for further use as regrind, alone or in combination with virgin polyolefin.

The extruded sheet can be fed from the extruder to a molding station where the thermoforming takes place or stored for further processing. In one example, the sheet is fed from the extruder to the molding station prior to the sheet cooling to room temperature and additional heat is optionally supplied to the sheet prior to forming the sheet around the mold. When the extruded sheet is stored prior to molding, heat is supplied to the sheet prior to forming the sheet around the mold. Heat for facilitating molding of the sheet during thermoforming can be supplied in any suitable manner, examples of which include radiant heat and heated air. Optionally, the thermoforming process includes blowing air onto the sheet to facilitating pressing the sheet about the mold. In another example, the thermoforming process can include vacuum molding in which the sheet is forced against the mold by a vacuum. Thermoforming can include a solid-phase forming process (e.g. using a reciprocating former) or a melt-phase forming process.

According to another aspect, the extrusion process of the polyolefin blend can be controlled to induce the formation of a plurality of expanded cells within the extruded sheet in the absence of a blowing agent. The polyolefin-blend can be extruded without venting or degassing to induce the formation of cells within the material. Without being limited to a particular theory, it is theorized that the absence of venting or degassing during extrusion results in moisture present in the blend being converted to steam which can create cells in the extrudate as the steam travels through the material, thus forming the plurality of expanded cells. Mineral fillers present in the blend, such as talc, can act as nucleating agents to facilitate the formation of cells within the extrudate.

In an exemplary embodiment, the polyolefin blend can be extruded through a rotary extruder having a single stage screw with no venting or degassing. The polyolefin blend can optionally include about 30-50% of a polyolefin regrind that includes a polyolefin and a mineral filler, such as talc. It is theorized that the regrind may have a higher moisture content than virgin polypropylene and thus may facilitate formation of the cells during extrusion without venting/degassing. The polyolefin regrind can be recycled trimmed material and/or recycled waste lids that is ground for inclusion in the polyolefin extrusion blend.

The extruded sheet formed without venting/degassing can be formed into a lid by thermoforming in the same manner as described above.

EXAMPLES

Example 1

Figure 2:
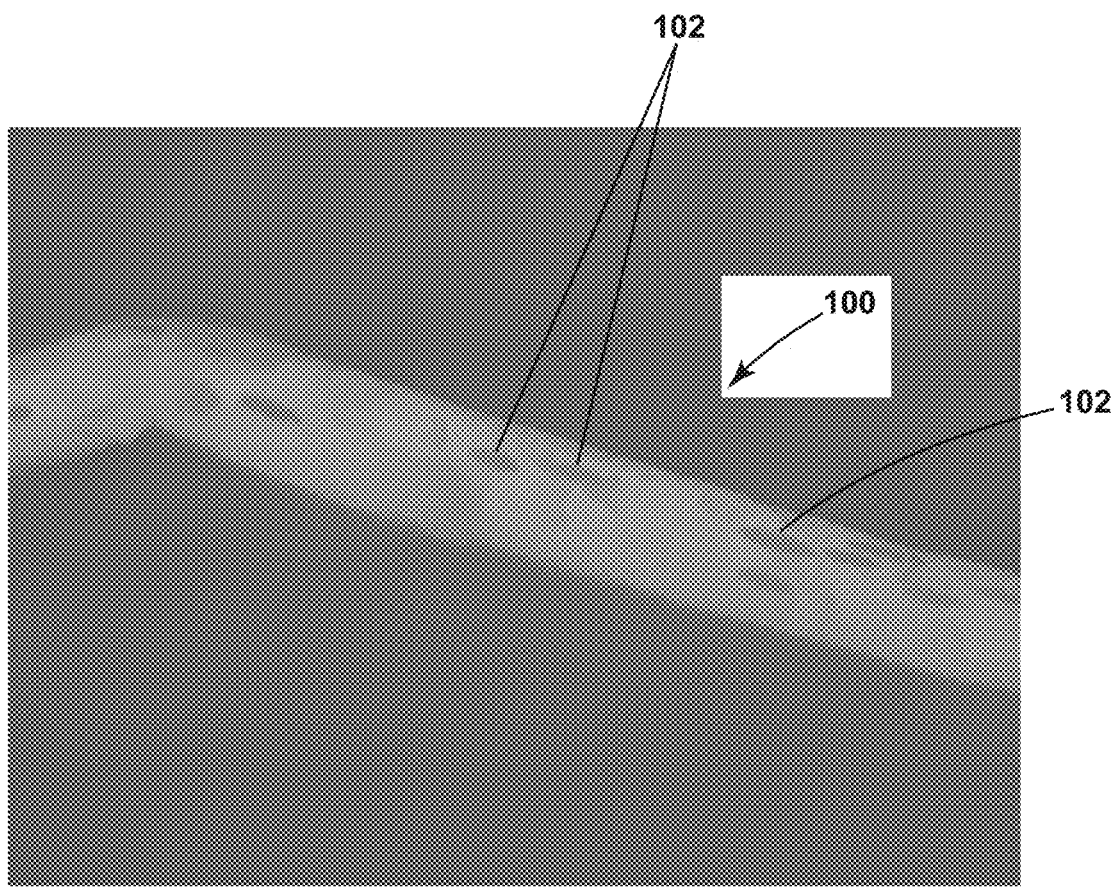
FIG. 2 is a cross-sectional view of an exemplary hot cup lid having a plurality of expanded cells according to an aspect of the disclosure.
Figure 3:
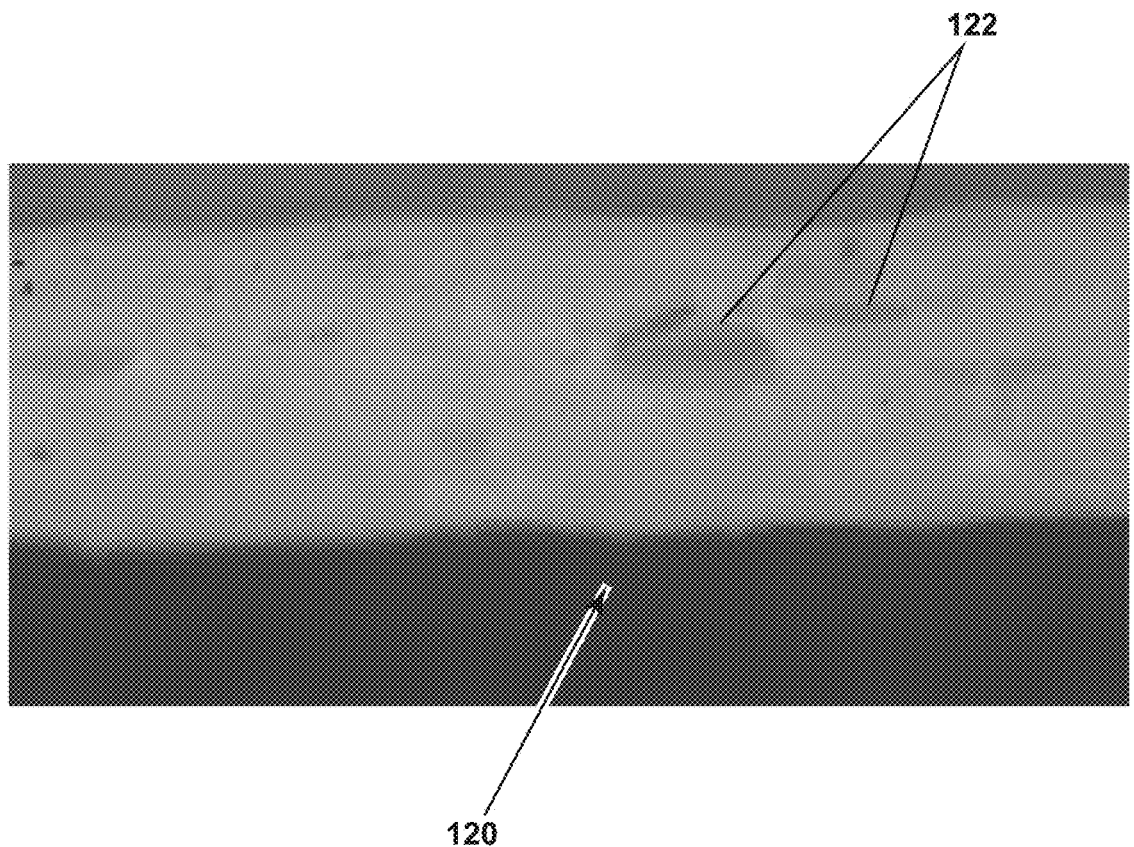
FIG. 3 is a cross-sectional view of an exemplary hot cup lid having a plurality of expanded cells according to an aspect of the disclosure.

FIGS. 2-3 are cross-sectional views of exemplary lids 100 and 120, respectively, according to an aspect of the present disclosure in which the polypropylene composition is treated to form a plurality of expanded cells formed therein to decrease the density of the polypropylene-based lids 100 and 120 compared to a similar polypropylene-based lid 140 that has not been treated to form an expanded cellular structure. Lids 100 and 120 of FIGS. 2 and 3, respectively, are made using a polyolefin composition in accordance with an aspect of the present disclosure including polypropylene and about 18-19 wt. % of talc masterbatch (talc combined with a polypropylene carrier) as a mineral filler. The measured talc content in lid 100 and 120 was 13.1% and 11.8%, respectively, as determined using Thermal Gravimetric Analysis (TGA) according to ASTM E1131 at 10° C./min.

Lid 100 was made using about 1.5 to 2.5 wt. % Hydrocerol 1499 from Clariant™ U.S.A. as a chemical blowing agent to form cells 102 in the lid body. The polypropylene blend for the lid 100 was extruded through a rotary extruder having a single stage screw, with venting, and thermoformed as described above to shape the extruded sheet into the form of the lid 100. The lid 120 of FIG. 3 was made in a similar manner, except that the blend for lid 120 did not include a chemical blowing agent, and instead was extruded through a rotary extruder having a single stage screw with no venting or degassing to form cells 122 in the lid body. The cells generally have an average diameter in the range of about 0.1 to 0.15 mm.

Figure 4:
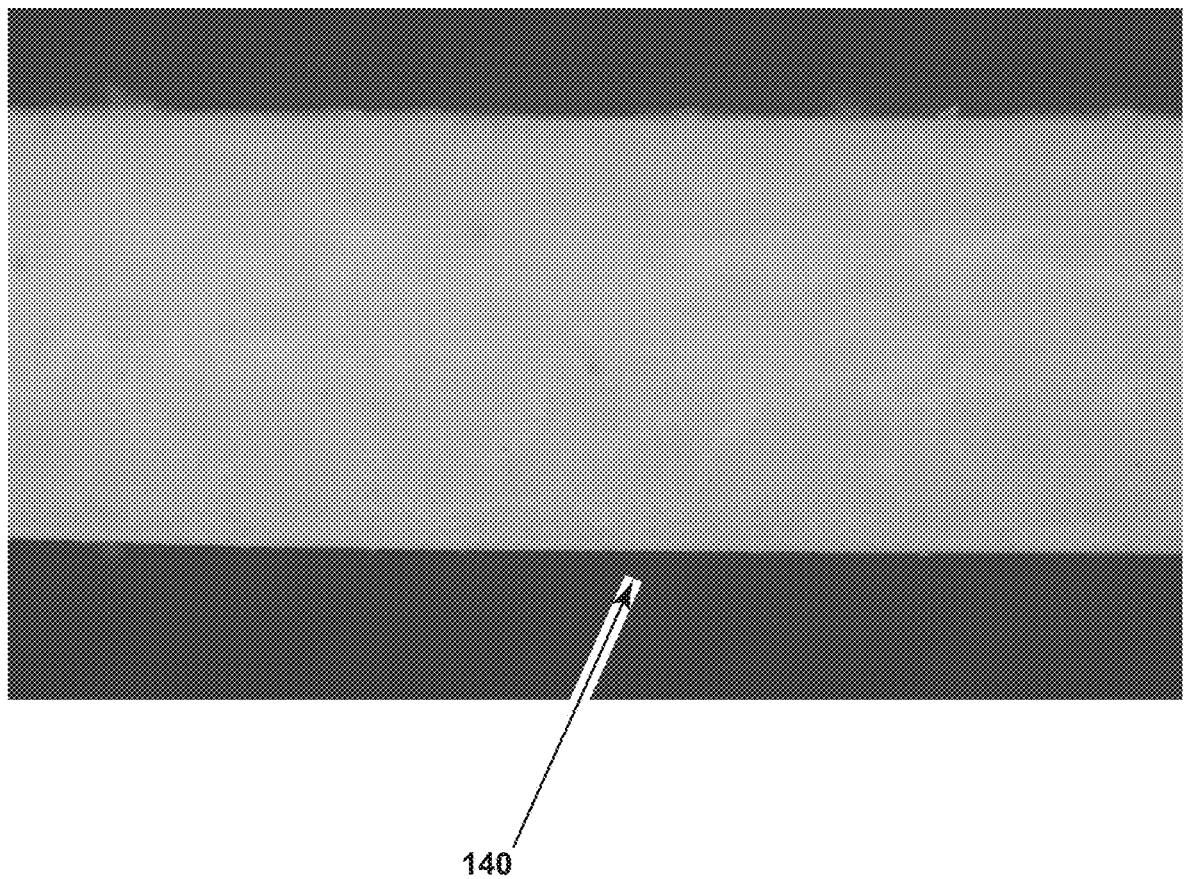
FIG. 4 is a cross-sectional view of a polypropylene-based hot cup lid that does not exhibit a plurality of expanded cells.

In contrast, the lid 140 of FIG. 4 was made using a polypropylene blend similar to that used to form the lid 120 and was extruded through a rotary extruder having a single stage screw with venting. The lid 140 was not formed from a blend that included a chemical blowing agent and was not formed using an extrusion process that was unvented and thus the lid 140 does not include an expanded cellular structure. Polypropylene lids made without treatment to induce cell formation, such as the lid 140, may include voids due to normal variations in processes and materials, e.g. such as induced by the filler particles. However, as illustrated by FIGS. 2-4, the untreated polypropylene lid of FIG. 4 does not exhibit the plurality of expanded cells demonstrated by the lids 100 and 120 of FIGS. 2 and 3.

Example 2

An exemplary polyolefin composition in accordance with an aspect of the present disclosure includes polypropylene, about 18-19 wt. % of talc as a mineral filler, and about 1.5-2.5 wt. % Hydrocerol 1499 masterbatch from Clariant™, U.S.A. as a chemical blowing agent. Hydrocerol 1499 is described by Clariant™, U.S.A. as a chemical foaming and nucleating agent masterbatch. The polyolefin composition was extruded into a sheet using conventional extrusion processes and thermoformed into a cup lid according to conventional thermoforming processes. The resultant cup lid had a stiffness comparable to a similarly formed HIPS cup lid (similar dimensions and part weight) and a density of about 0.95-0.96 g/cm$^3$. The polypropylene-based lid floated on water. As used herein, density is determined at 23° C. and atmospheric pressure according to ASTM D-792.

Comparative Example 1

The polyolefin composition and cup lid of Example 1 except that the polyolefin composition did not include a chemical blowing agent. The comparative cup lid had stiffness comparable to a similarly formed HIPS cup lid (similar dimensions and part weight), but did not float on water.

Example 3

Table 1 below illustrates the characteristics of three exemplary polyolefin compositions for forming a cup lid according to an aspect of the present disclosure. In each of the Compositions 1-3, the polyolefin is a polypropylene homopolymer commercially available as Inspire® 6025N from Braskem, U.S.A. The talc filler is commercially available as HT6HP from Heritage Plastics, which is described as 60% talc concentrated in a polypropylene homopolymer (masterbatch).

Each Composition 1-3 was extruded through a single stage screw rotary extruder with no venting or degassing to form a sheet having plurality of expanded cells. The sheet was used to form a cup lid having the shape of the lid of FIG. 1 in a thermoforming process, as described above. The total talc filler content in the lid was determined using both Thermal Gravimetric Analysis (TGA) and Ash Content. The density of the lid was determined using water displacement. TGA was conducted according to ASTM E1131 at 10° C./min. Ash Content was conducted according to ASTM D3174.

TABLE 1

Characteristics of Lid with Expanded Cellular Structure Without Chemical Blowing Agent

| Composition | Talc Masterbatch (%) | TGA Residue (%) | Ash Content (%) | Density (g/cm$^3$)* |
|---|---|---|---|---|
| 1 | 17 | 8.9 | 9.5 | 0.933 |
| 2 | 30 | 13.0 | 19.4 | 0.954 |
| 3 | 40 | 18.3 | 17.7 | 0.950 |

*The density for each Composition 1-3 is the average of two samples.

The data in Table 1 demonstrate that even as the talc filler content increases, the expanded cellular structure of the lid induced by not venting or degassing during extrusion facilitates maintaining the density of the cup lid at a value that is comparable to a much lower filler content. A similar lid formed using Compositions 2 and 3 in an extruder using a conventional process in which venting and degassing is performed would be expected to have a density of at least about 1.02 to 1.05 g/cm$^3$.

Figure 5:
FIG. 5 is a photograph illustrating the ability of a hot cup lid having a plurality of expanded cells to float in water according to an aspect of the disclosure.

FIG. 5 illustrates the ability of a lid according to the present disclosure to float in water. A lid made using Composition 2 of Table 1 above was extruded through a single stage screw rotary extruder with no venting or degassing to form a sheet having plurality of expanded cells. The lid was formed from the sheet by thermoforming and then cut into pieces and placed in a bottle of water. The pieces of the lid were able to float, indicative of the ability of the lid to be recycled from a recycling stream.

Example 4

Table 2 below illustrates the characteristics of four sample lids made using a polyolefin-based sheet according to an aspect of the present disclosure. Each of the PP Samples 1-4 were made using a polyolefin blend that includes a polypropylene homopolymer commercially available as Inspire® 6025N from Braskem, U.S.A., 25 wt. % of HT6HP talc masterbatch from Heritage Plastics, and about 1.5-2.5 wt. % Hydrocerol 1499 masterbatch from Clariant™, U.S.A. as a chemical blowing agent. The composition also includes 3 wt. % titanium dioxide as a colorant, an example of which is commercially available as CH27043 2FA masterbatch from Ferro Corporation, U.S.A.

The polyolefin blend was extruded through a single stage screw rotary extruder according to conventional extrusion processes to form a sheet. The sheet was used to form a cup lid having the shape of the lid of FIG. 1 by thermoforming, as described above. The density of PP Samples 1-4 was 0.932 g/cm$^3$, as determined according to ASTM D-792.

HIPS Comparative Sample 1 is a conventional HIPS lid that was made according to the same procedures as PP Samples 1-4, except the extrusion blend included HIPS instead of polypropylene and was free of a chemical blowing agent.

Figure 6:
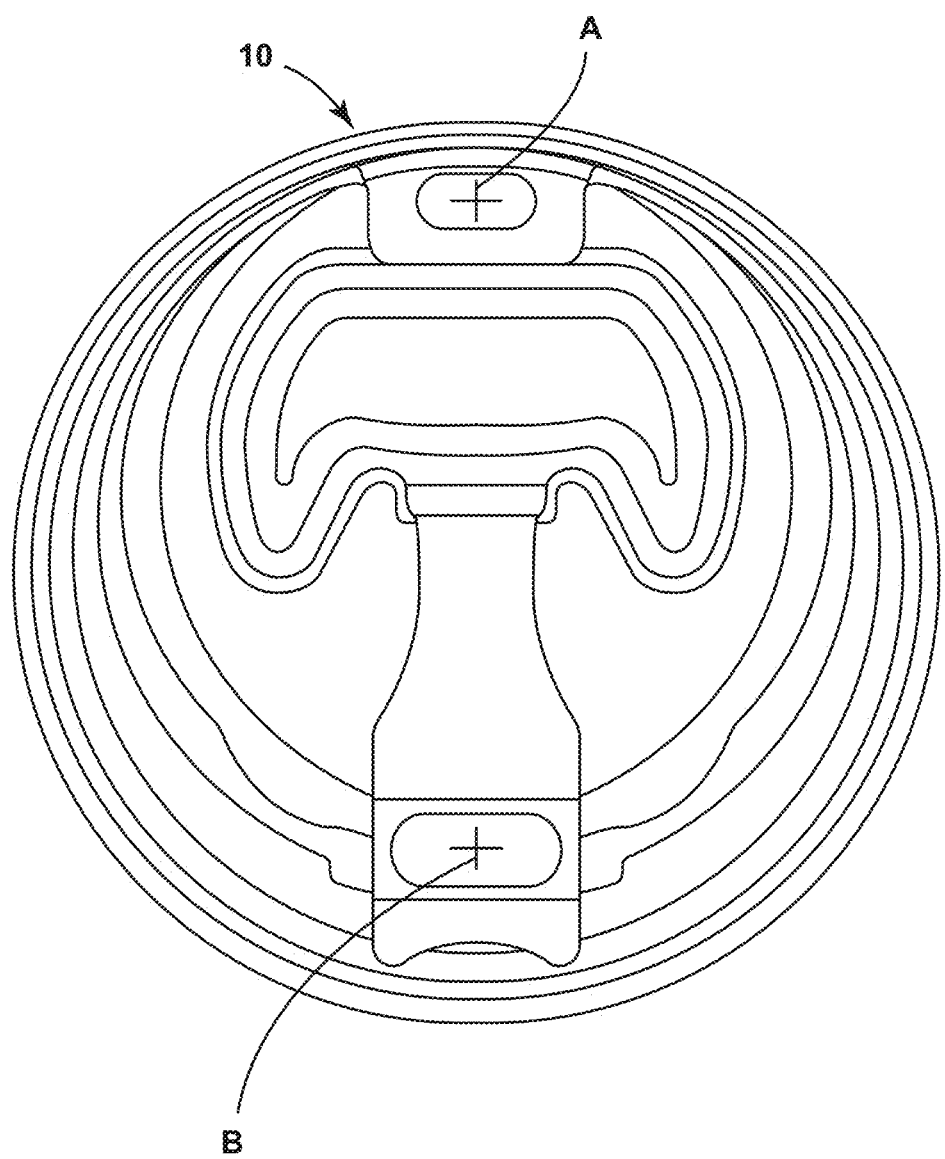
FIG. 6 is top-down view of a hot cup lid indicating the hot deflection test measurement points according to an aspect of the disclosure.

The stiffness of the PP Sample and HIPS Comparative Sample lids were analyzed using a hot deflection test which measures the weight required to deflect the lid by 0.25 inches (6.4 mm) at two different points on the lid. The hot deflection test was conducted on lids that were placed on a coffee cup holding coffee at 200° F. (93° C.). FIG. 6 illustrates the locations, Point A and Point B, on the lid 10 at which the deflection tests were conducted.

TABLE 2

PP Lid with Chemical Blowing Agent Compared to HIPS Lid

| Lid | Weight | 0.25" Hot Deflection (kg) | |
|---|---|---|---|
| | | Point A | Point B |
| PP Sample 1 | 4.34 | 2.687 | 2.222 |
| PP Sample 2 | 4.35 | 2.736 | 2.183 |
| PP Sample 3 | 4.35 | 2.691 | 2.118 |
| PP Sample 4 | 4.35 | 2.821 | 2.000 |
| HIPS Comparative Sample 1 | 4.17 | 2.541 | 1.836 |

The hot deflection data in Table 2 demonstrates that the PP Samples 1-4 made according to the present disclosure have at least comparable stiffness to a conventional HIPS lid, and even improved stiffness in some instances, in a hot beverage setting. The PP Samples also have a comparable part weight to that of the conventional HIPS lid. The PP samples 1-4 also exhibit lid retention and leak resistance characteristics similar to the conventional HIPS lid. The data in Table 2 demonstrates that the PP lids made according to the present disclosure are suitable for replacement of HIPS lids in a hot food service setting.

Similar PP lids without the talc filler of PP Samples 1-4 are softer than the HIPS Comparative Sample and thus do not demonstrate the stiffness, lid retention, and leak resistance characteristics suitable for a lid that can replace a conventional HIPS lid. The addition of the filler to the polyolefin blend of the present disclosure provides a lid having the stiffness, lid retention, and leak resistance characteristics suitable for replacement of a conventional HIPS lid.

The addition of the blowing agents to the polyolefin blend provides the PP Samples with a plurality of expanded cells and a density reduction compared to a lid that does not have a plurality of expanded cells. Because the density of the PP samples is less than 1 g/cm$^3$, the PP Sample lids can float in a recycling stream, thus providing a polyolefin lid that has the stiffness, lid retention, and leak resistance characteristics suitable for replacement of a conventional HIPS lid and which is also recyclable.

In addition, the PP Sample lids according to the present disclosure have a matte finish that is aesthetically pleasing to consumers. The expanded cellular structure is generally not visible or minimally visible to the naked eye. A low gloss level of about 15 gloss units or less generally correlates with a matte or paper-like finish aesthetic.

The following clauses define additional aspects of the present disclosure which are encompassed herein. These aspects can be combined as desired to form combinations that are encompassed by the present disclosure.

A lid for a food or beverage container according to an aspect of the present disclosure is made from a sheet formed from an extruded composition comprising at least one polyolefin, at least one filler, and a blowing agent, wherein the sheet has a thickness of 0.035 inches (0.9 mm) or less and plurality of expanded cells formed within the sheet. The lid can optionally include any one or any combination of the following features according to an aspect of the present disclosure: the polyolefin can be selected from the group consisting of polypropylene homopolymer, polypropylene impact copolymers, ethylene-propylene copolymers, high density polyethylene, and combinations thereof; the at least one filler can be selected from talc, calcium carbonate, mica, wollastonite, wood fiber, paper powder, cellulose fiber, and combinations thereof; the sheet can have a thickness in the range of about 0.015 to 0.018 inches (0.4 to 0.46 mm); the filler can be present in an amount of at least 12 wt. % or greater; the blowing agent can be a chemical blowing agent selected from the group consisting of sodium bicarbonate, sodium carbonate, ammonium bicarbonate, ammonium carbonate, and ammonium nitrite; the blowing agent can be present in an amount of about 0.2 to 3 wt. %; and/or a specific gravity of the lid can be less than 1 relative to water at 23° C.

A polyolefin-based extruded sheet according to an aspect of the present disclosure can include at least one polyolefin, at least one filler, wherein the at least one filler is present in an amount such that a total amount of filler is 12 wt. % or greater, and a thickness of 0.035 inches (0.9 mm) or less, wherein the extruded sheet has a plurality of expanded cells such that a density of the extruded sheet is less than water at 23° C. The polyolefin-based extruded sheet can optionally include any one or any combination of the following features according to an aspect of the present disclosure: the polyolefin can be selected from the group consisting of polypropylene homopolymer, polypropylene impact copolymers, ethylene-propylene copolymers, high density polyethylene, and combinations thereof; the polyolefin can include a polypropylene having a flexural modulus of at least about 290,000 psi; the polyolefin can include a polypropylene having a heat deflection temperature of at least 95° C.; the at least one filler can be selected from talc, calcium carbonate, mica, wollastonite, wood fiber, paper powder, cellulose fiber, and combinations thereof; the total amount of the at least one filler is 18 wt. % or greater; the plurality of expanded cells include cells having an average cell diameter in the range of about 0.01 to 0.15 mm; the at least one polyolefin can be combined with a blowing agent during extrusion to expand the polyolefin; the density can be in the range of about 0.900 to 0.999 g/cm$^3$; and/or the sheet can have a shrinkage rate of about 1.3 to 1.5% during storage.

A process for forming a lid for a food or beverage container according to an aspect of the present disclosure includes the following: providing a polyolefin blend including at least one polyolefin and at least one filler to an extruder; extruding the polyolefin blend to form a polyolefin-based sheet, wherein the extruding takes place without venting or degassing; expanding the polyolefin-based sheet to form a plurality of expanded cells; and forming the expanded polyolefin-based sheet into the shape of a lid, wherein the lid has a density less than water at 23° C. The process can optionally include any one or any combination of the following features: the polyolefin can be selected from the group consisting of polypropylene homopolymer, polypropylene impact copolymers, ethylene-propylene copolymers, high density polyethylene, and combinations thereof; the polyolefin can include a polypropylene having a flexural modulus of at least about 290,000 psi; the polyolefin can include a polypropylene having a heat deflection temperature of at least 95° C.; the at least one filler can be selected from talc, calcium carbonate, mica, wollastonite, wood fiber, paper powder, cellulose fiber, and combinations thereof; a total amount of the at least one filler can be about 12 wt. % or greater; the polyolefin-based sheet can be expanded to decrease the density by about 5 to 10%; the plurality of expanded cells can include cells having an average cell diameter in the range of about 0.01 to 0.15 mm; a stiffness of the lid can be comparable to a similar lid made from unexpanded high impact polystyrene, wherein stiffness is based on a weight required to induce a 0.25 inch (6.4 mm) deflection of the lid when the lid is placed on a cup holding liquid at 200° F. (93° C.); the density can be in the range of about 0.900 to 0.999 g/cm$^3$; the polyolefin-based sheet can have a shrinkage rate of about 1.3 to 1.5% during storage; the expanded polyolefin-based sheet can have a thickness of 0.035 inches (0.9 mm) or less; and/or the polyolefin-blend can include about 30 to 50% regrind material including a polyolefin and a filler.

A method of thermoforming a lid according to an aspect of the present disclosure includes heating a sheet including at least one polyolefin with at least one filler, wherein the sheet has a plurality of expanded cells providing the sheet with a density of less than 1 g/cm$^3$ at 23° C., applying the heated sheet about a lid mold to form at least one lid in the sheet, and removing the formed at least one lid from the sheet. The method can optionally include any one or any combination of the following features: forming the sheet with an extruder; feeding the sheet from the extruder to the lid mold; forming the sheet with an extruder also effects the heating of the sheet; the extruder provides the sheet as a molten sheet to a lid mold; forming the sheet with an extruder can include extruding a composition comprising the at least one polyolefin, at least one filler, and a blowing agent; forming the sheet with an extruder can include extruding the at least one polyolefin and at least one filler without venting or degassing during extrusion; the heating can include radiantly heating the sheet; applying the heated sheet can include blowing air on the sheet to press the sheet about the mold; the sheet can have a thickness of 0.035 inches (0.9 mm) or less; the lid can have a shrinkage rate of about 1.3 to 1.5% after the formed lid is removed from the sheet; the polyolefin can be selected from the group consisting of polypropylene homopolymer, polypropylene impact copolymers, ethylene-propylene copolymers, high density polyethylene, and combinations thereof; the polyolefin can include a polypropylene having a flexural modulus of at least about 290,000 psi; the polyolefin can include a polypropylene having a heat deflection temperature of at least 95° C.; the at least one filler can be selected from talc, calcium carbonate, mica, wollastonite, wood fiber, paper powder, cellulose fiber, and combinations thereof; and/or a total amount of the at least one filler can be 12 wt. % or greater.

To the extent not already described, the different features and structures of the various aspects of the present disclosure may be used in combination with each other as desired. For example, one or more of the features illustrated and/or described with respect to one of the aspects of the present disclosure can be used with or combined with one or more features illustrated and/or described with respect to the other aspects. That one feature may not be illustrated in all aspects of the present disclosure is not meant to be construed that it cannot be, but is done for brevity of description. Thus, the various features of the different aspects may be mixed and matched as desired to form new aspects, whether or not the new aspects are expressly described.

While aspects of the present disclosure have been specifically described in connection with certain specific aspects thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A process for forming a lid for a food or beverage container from a polyolefin-based sheet, the process comprising:
    providing a polyolefin blend comprising at least one polyolefin and at least one filler to an extruder;
    providing a blowing agent to the polyolefin blend;
    extruding, without venting, the polyolefin blend to form a polyolefin-based sheet; and
    at least partially expanding the polyolefin-based sheet to form an expanded polyolefin-based sheet having a plurality of expanded cells; and
    forming the expanded polyolefin-based sheet into the shape of a lid;
    wherein the lid has a density in the range of 0.900 to 0.999 g/cm$^3$ at 23° C.

2. The process of claim 1 wherein the polyolefin comprises a polypropylene having one of:
    a flexural modulus of at least greater than or equal to 290,000 psi;
    a heat deflection temperature of at least 95° C.; or a combination of a flexural modulus of at least greater than or equal to 290,000 psi and a heat deflection temperature of at least 95° C.

3. The process of claim 1 wherein the at least one filler is selected from talc, calcium carbonate, mica, wollastonite, wood fiber, paper powder, cellulose fiber, or combinations thereof.

4. The process of claim 1 wherein a total amount of the at least one filler is greater than 12 wt. %.

5. The process of claim 1 wherein the polyolefin-based sheet is expanded to decrease the density by 5 to 10%.

6. The process of claim 1 wherein forming the expanded polyolefin-based sheet into the shape of a lid comprises heating the sheet, applying the heated sheet a lid mold to form at least one lid in the sheet, and removing the formed at least one lid from the sheet.

7. A process for forming a lid for a food or beverage container from a polyolefin-based sheet, the process comprising:
providing a polyolefin blend comprising at least one polyolefin and at least one filler to an extruder;
providing a blowing agent to the polyolefin blend;
extruding, without venting, the polyolefin blend to form a polyolefin-based sheet; and
at least partially expanding the polyolefin-based sheet to form an expanded polyolefin-based sheet having a plurality of expanded cells with an average cell diameter in the range of 0.01 to 0.15 mm; and
forming the expanded polyolefin-based sheet into the shape of a lid;
wherein the lid has a density less than water at 23° C.

8. The process of claim 7 wherein the lid has a density in the range of 0.900 to 0.999 g/cm$^3$.

9. The process of claim 8 wherein the lid comprises at least one of:
a stiffness of the lid is comparable to a similar lid made from unexpanded high impact polystyrene, and wherein stiffness is based on a weight required to induce a 0.25 inch deflection of the lid when the lid is placed on a cup holding liquid at 200° F.;
a shrinkage rate of 1.3 to 1.5% during storage; or
combinations thereof.

10. The process of claim 9 wherein the blowing agent is at least one of:
selected from the group consisting of sodium bicarbonate, sodium carbonate, ammonium bicarbonate, ammonium carbonate, and ammonium nitrite;
present in an amount of 0.2 to 3 wt. %; or
combinations thereof.

11. The process of claim 7 wherein the polyolefin is selected from the group consisting of polypropylene homopolymers, polypropylene impact copolymers, ethylene-propylene copolymers, high density polyethylene, and combinations thereof.

12. The process of claim 7 wherein the polyolefin comprises a polypropylene having one of:
a flexural modulus of at least greater than or equal to 290,000 psi;
a heat deflection temperature of at least 95° C.; or
a combination of a flexural modulus of at least greater than or equal to 290,000 psi and a heat deflection temperature of at least 95° C.

13. The process of claim 7 wherein the at least one filler is selected from talc, calcium carbonate, mica, wollastonite, wood fiber, paper powder, cellulose fiber, or combinations thereof.

14. The process of claim 7 wherein a total amount of the at least one filler is greater than 12 wt. %.

15. The process of claim 7 wherein the polyolefin-based sheet is expanded to decrease the density by 5 to 10%.

16. The process of claim 7 wherein forming the expanded polyolefin-based sheet into the shape of a lid comprises heating the sheet, applying the heated sheet a lid mold to form at least one lid in the sheet, and removing the formed at least one lid from the sheet.

17. A process for forming a lid for a food or beverage container from a polyolefin-based sheet, the process comprising:
providing a polyolefin blend comprising at least one polyolefin and at least one filler to an extruder;
providing a blowing agent to the polyolefin blend;
extruding, without venting, the polyolefin blend to form a polyolefin-based sheet; and
at least partially expanding the polyolefin-based sheet to form an expanded polyolefin-based sheet having a plurality of expanded cells; and
forming the expanded polyolefin-based sheet into the shape of a lid;
wherein the lid has a density less than water at 23° C., and
wherein the lid comprises at least one of:
a stiffness of the lid is comparable to a similar lid made from unexpanded high impact polystyrene, and wherein stiffness is based on a weight required to induce a 0.25 inch deflection of the lid when the lid is placed on a cup holding liquid at 200° F.;
a shrinkage rate of 1.3 to 1.5% during storage; or
combinations thereof.

18. The process of claim 17 wherein the lid has a density in the range of 0.900 to 0.999 g/cm$^3$.

19. The process of claim 17 wherein the blowing agent is at least one of:
selected from the group consisting of sodium bicarbonate, sodium carbonate, ammonium bicarbonate, ammonium carbonate, and ammonium nitrite;
present in an amount of 0.2 to 3 wt. %; or
combinations thereof.

20. The process of claim 17 wherein the plurality of expanded cells has an average cell diameter in the range of 0.01 to 0.15 mm.

21. The process of claim 1 wherein the polyolefin is selected from the group consisting of polypropylene homopolymers, polypropylene impact copolymers, ethylene-propylene copolymers, high density polyethylene, and combinations thereof.

22. The process of claim 1 wherein the blowing agent is at least one of:
selected from the group consisting of sodium bicarbonate, sodium carbonate, ammonium bicarbonate, ammonium carbonate, and ammonium nitrite;
present in an amount of 0.2 to 3 wt. %; or
combinations thereof.

23. The process of claim 22 wherein the plurality of expanded cells has an average cell diameter in the range of 0.01 to 0.15 mm.

24. A process for forming a lid for a food or beverage container from a polyolefin-based sheet, the process comprising:
providing a polyolefin blend comprising at least one polyolefin and at least one filler to an extruder;
providing a blowing agent to the polyolefin blend, wherein the blowing agent is at least one of:

selected from the group consisting of sodium bicarbonate, sodium carbonate, ammonium bicarbonate, ammonium carbonate, and ammonium nitrite; present in an amount of 0.2 to 3 wt. %; or combinations thereof;

extruding, without venting, the polyolefin blend to form a polyolefin-based sheet; and at least partially expanding the polyolefin-based sheet to form an expanded polyolefin-based sheet having a plurality of expanded cells; and forming the expanded polyolefin-based sheet into the shape of a lid;

wherein the lid has a density less than water at 23° C.

25. The process of claim 24 wherein the plurality of expanded cells has an average cell diameter in the range of 0.01 to 0.15 mm.

\* \* \* \* \*